United States Patent
Zhao et al.

(10) Patent No.: US 10,074,351 B2
(45) Date of Patent: Sep. 11, 2018

(54) KARAOKE PROCESSING METHOD AND SYSTEM

(71) Applicant: GUANGZHOU KUGOU COMPUTER TECHNOLOGY CO., LTD., Guangzhou, Guangdong Prov. (CN)

(72) Inventors: Weifeng Zhao, Shenzhen (CN); Chun Li, Shenzhen (CN); Xiang Liu, Shenzhen (CN); Haojie Xu, Shenzhen (CN); Dewen Zhang, Shenzhen (CN); Fei Zheng, Shenzhen (CN); Li Cao, Shenzhen (CN); Tianwen Li, Shenzhen (CN); Xiangwen Chen, Shenzhen (CN)

(73) Assignee: GUANGZHOU KUGOU COMPUTER TECHNOLOGY CO., LTD., Guangzhou, Guangdong (CN)

( * ) Notice: Subject to any disclaimer, the term of this patent is extended or adjusted under 35 U.S.C. 154(b) by 0 days.

(21) Appl. No.: 15/576,471

(22) PCT Filed: May 11, 2016

(86) PCT No.: PCT/CN2016/081651
§ 371 (c)(1),
(2) Date: Nov. 22, 2017

(87) PCT Pub. No.: WO2016/188323
PCT Pub. Date: Dec. 1, 2016

(65) Prior Publication Data
US 2018/0158441 A1    Jun. 7, 2018

(30) Foreign Application Priority Data
May 27, 2015 (CN) .......................... 2015 1 0280492

(51) Int. Cl.
*G10H 1/36* (2006.01)
*G10H 1/00* (2006.01)

(52) U.S. Cl.
CPC .............. *G10H 1/365* (2013.01); *G10H 1/00* (2013.01); *G10H 1/0008* (2013.01); *G10H 2210/005* (2013.01)

(58) Field of Classification Search
CPC .. G10H 2220/011; G10H 1/365; G10H 1/361; G10H 2240/325; G10H 2240/125; G10H 1/36
See application file for complete search history.

(56) References Cited

U.S. PATENT DOCUMENTS 5,652,401 A * 7/1997 Nakamura ........... G10H 1/0033
 84/613
5,672,838 A * 9/1997 Lee ........................ G10H 1/361
 434/307 A (Continued)

FOREIGN PATENT DOCUMENTS

CN    101859561 A    10/2010
CN    102456340 A    5/2012

(Continued)

OTHER PUBLICATIONS

International Search Report (in Chinese with English Translation) for PCT/CN2016/081651, dated Aug. 5, 2016; ISA/CN, Haidian District, Beijing.

(Continued)

*Primary Examiner* — Marlon Fletcher
(74) *Attorney, Agent, or Firm* — Harness, Dickey & Pierce, P.L.C.

(57) ABSTRACT

A karaoke processing method and a karaoke processing system are provided. The method includes: receiving a first antiphonal singing request inputted by a first user; acquiring an accompaniment audio file and a lyrics file of a song from (Continued)

a server based on the first antiphonal singing request, and recording singing performed by the first user based on a part of lyrics by using the accompaniment audio file and the lyrics file, to obtain a first recorded file; determining a first lyrics part based on the first recorded file and generating paragraph information; performing audio mixing processing on the first recorded file and the accompaniment audio file, to obtain a first target file; and sending the first target file and the paragraph information to the server.

20 Claims, 4 Drawing Sheets

(56) References Cited

U.S. PATENT DOCUMENTS

| | | | | |
|---|---|---|---|---|
| 5,691,494 | A * | 11/1997 | Sai | G10H 1/0033 |
| | | | | 348/E7.049 |
| 5,734,636 | A * | 3/1998 | Lee | G10H 1/363 |
| | | | | 369/30.04 |
| 5,808,224 | A * | 9/1998 | Kato | G10H 1/365 |
| | | | | 206/307 |
| 5,810,603 | A * | 9/1998 | Kato | G10H 1/365 |
| | | | | 370/432 |
| 5,811,708 | A | 9/1998 | Matsumoto | |
| 5,869,783 | A * | 2/1999 | Su | G10H 1/361 |
| | | | | 84/612 |
| 6,121,531 | A * | 9/2000 | Kato | G10H 1/366 |
| | | | | 434/307 A |
| 7,917,238 | B1 * | 3/2011 | Lapcevic | G10H 1/365 |
| | | | | 700/94 |
| 8,779,265 | B1 * | 7/2014 | Gottlieb | G10H 1/0033 |
| | | | | 84/600 |
| 9,639,966 | B2 * | 5/2017 | Oshima | G06T 11/206 |
| 9,858,910 | B2 * | 1/2018 | Xiao | G10H 1/365 |
| 2002/0121180 | A1 | 9/2002 | Kondo | |
| 2002/0132212 | A1 | 9/2002 | Hou | |
| 2002/0162445 | A1 * | 11/2002 | Naples | G10H 1/365 |
| | | | | 84/610 |
| 2002/0189429 | A1 * | 12/2002 | Qian | G10H 1/0041 |
| | | | | 84/610 |
| 2006/0077767 | A1 * | 4/2006 | Young | G11B 19/025 |
| | | | | 369/30.01 |
| 2009/0031883 | A1 * | 2/2009 | Bennetts | G10H 1/0058 |
| | | | | 84/609 |
| 2010/0089223 | A1 * | 4/2010 | Ting | G10H 1/361 |
| | | | | 84/610 |
| 2011/0246186 | A1 * | 10/2011 | Takeda | G10H 1/0008 |
| | | | | 704/201 |
| 2016/0300557 | A1 * | 10/2016 | Xiao | G11B 27/10 |
| 2018/0004740 | A1 * | 1/2018 | Liang | G06F 17/30017 |
| 2018/0090116 | A1 * | 3/2018 | Zhao | G10H 1/361 |
| 2018/0158441 | A1 * | 6/2018 | Zhao | G10H 1/365 |
| 2018/0158442 | A1 * | 6/2018 | Zhao | G10H 1/365 |

FOREIGN PATENT DOCUMENTS

| | | |
|---|---|---|
| CN | 102497448 A | 6/2012 |
| CN | 103295568 A | 9/2013 |
| CN | 104392711 A | 3/2015 |
| CN | 105023559 A | 11/2015 |
| EP | 0725381 A1 | 8/1996 |
| EP | 3007163 A1 | 4/2016 |

OTHER PUBLICATIONS

Written Opinion (in Chinese) for PCT/CN2016/081651, dated Aug. 5, 2016; ISA/CN, Haidian District, Beijing.

* cited by examiner

KARAOKE PROCESSING METHOD AND SYSTEM

This application is the national phase of International Patent Application No. PCT/CN2016/081651, filed on May 11, 2016, which claims the priority to Chinese Patent Application No. 201510280492.9, titled "KARAOKE PROCESSING METHOD AND SYSTEM", filed with the Chinese State Intellectual Property Office on May 27, 2015, both of which are incorporated herein by reference in their entireties.

FIELD

The present disclosure relates to the field of audio processing, and particularly to a karaoke processing method and a karaoke processing system.

BACKGROUND

With quality enhancement of people's life, karaoke applications are gradually entering into people's daily life, with increasingly rich functions.

The karaoke application is a combination of a music player and recoding software, which may not only play the original vocal, but also record singing of a user, and mix the recoded singing and an accompaniment to obtain a music file. The user may also upload the above music file onto the Internet, so that more people can hear his/her song.

Typically, when the user records his/her song, the karaoke application provides an accompaniment audio file to serve as accompaniment for recording the song of the user. However, in this way, the user can only sing alone, while cannot have the karaoke experience of singing with another person.

SUMMARY

A karaoke processing method and a karaoke processing system are provided according to the embodiments of the present disclosure, to provide the karaoke experience of singing together with another person.

A karaoke processing method is provided in a first aspect of the embodiments of the present disclosure, which includes:

receiving, by a first client, a first antiphonal singing request inputted by a first user, where the first antiphonal singing request is used to request initiating antiphonal singing;

acquiring, by the first client, an accompaniment audio file and a lyrics file of a song from a server based on the first antiphonal singing request, and recording, by the first client, singing performed by the first user based on a part of lyrics by using the accompaniment audio file and the lyrics file, to obtain a first recorded file;

determining a first lyrics part and generating paragraph information by the first client, where the first lyrics part is the part of lyrics already sung by the first user, and the paragraph information includes identification information for identifying the first lyrics part;

performing, by the first client, audio mixing processing on the first recorded file and the accompaniment audio file, to obtain a first target file; and sending, by the first client, the first target file and the paragraph information to the server.

A karaoke processing system is provided in a second aspect of the embodiments of the present disclosure, which includes a first client and a second client, where the first client is configured to: receive a first antiphonal singing request inputted by a first user, where the first antiphonal singing request is used to request to initiating antiphonal singing; acquire an accompaniment audio file and a lyrics file of a song from a server based on the first antiphonal singing request, and record singing performed by the first user based on a part of lyrics by using the accompaniment audio file and the lyrics file, to obtain a first recorded file; determine a first lyrics part based on the first recorded file and generate paragraph information, where the first lyrics part is the part of lyrics already sung by the first user, and the paragraph information includes identification information for identifying the first lyrics part; perform audio mixing processing on the first recorded file and the accompaniment audio file, to obtain a first target file; and send the first target file and the paragraph information to the server; and the second client is configured to acquire the first target file and the paragraph information from the server, and provide a karaoke service to a second user based on the paragraph information with taking the first target file as accompaniment audio.

In the technical solution according to the embodiments of the present disclosure, upon receiving the first antiphonal singing request inputted by the first user, the first client acquires the accompaniment audio file and the lyrics file of the song from the server based on the first antiphonal singing request, and records singing performed by the first user based on a part of lyrics by using the accompaniment audio file and the lyrics file to obtain the first recorded file. Then the first client determines a first lyrics part and generates paragraph information, where the first lyrics part is the part of lyrics already sung by the first user, and the paragraph information includes identification information for identifying the first lyrics part. Then the first client performs audio mixing processing on the first recorded file and the accompaniment audio file to obtain a first target file, and sends the first target file and the paragraph information to the server, so that the second client acquires the first target file and the paragraph information from the server and provides a karaoke service to the second user based on the paragraph information with taking the first target file as accompaniment audio. Therefore, the first target file in the embodiments of the present disclosure includes the singing of the first user only in a display time of the first lyrics part, and the accompaniment for the other part of the lyrics than the first lyrics part. In this case, singing may be performed based on the other part of the lyrics than the first lyrics part according to the paragraph information when the second client takes the first target file as accompaniment audio. Therefore, it can be realized that the first user performs singing in the display time of the first lyrics part, and the second user performs singing in a display time of the other part of the lyrics than the first lyrics part, thereby providing the karaoke experience of singing together with another person.

DETAILED DESCRIPTION OF THE EMBODIMENTS

A karaoke processing method and a karaoke processing system are provided according to the embodiments of the present disclosure, to realize the karaoke experience of singing together with another person. The karaoke processing method and the karaoke processing system are described in detail below.

The technical solutions according to the embodiments of the present disclosure are described clearly and completely in conjunction with drawings in the embodiments of the present disclosure. Apparently, the described embodiments are only a part rather than all of the embodiments of the present disclosure. All other embodiments obtained by those skilled in the art without creative work based on the embodiments of the present disclosure fall within the protection scope of the present disclosure.

Terms such as "first", "second", "third" and "fourth" (if present) in the specification and claims and the above drawings of the present disclosure are used to distinguish similar objects, rather than describe a specific order or a sequential order. It should be understood that data described with the terms may be exchanged in suitable situations, so that the embodiments described here can be embodied in an order other than content shown or described here. In addition, terms such as "include" and "comprise" and any variations thereof are intended to cover non-exclusive "include", for example, a process, a method, a system, a product or a device including a series of steps or units not only includes the steps or units listed clearly, but may also include other steps or units not listed clearly or inherent to the process, the method, the product or the device.

It should be noted that, the client in the embodiments of the present disclosure may include a phone, a personal computer (PC) and/or a panel computer or other device. In actual implementation, a karaoke service may be accessed by logging onto a webpage through the client, or loading a program on the client, or using applications (App) published through various mobile platforms.

In the embodiments of the present disclosure, a server is connected to the client via a network. The server may be constructed by a service provider (for example, a karaoke service provider) for managing and operating a service provided by the service provider, and the server may include various servers.

Figure 1:
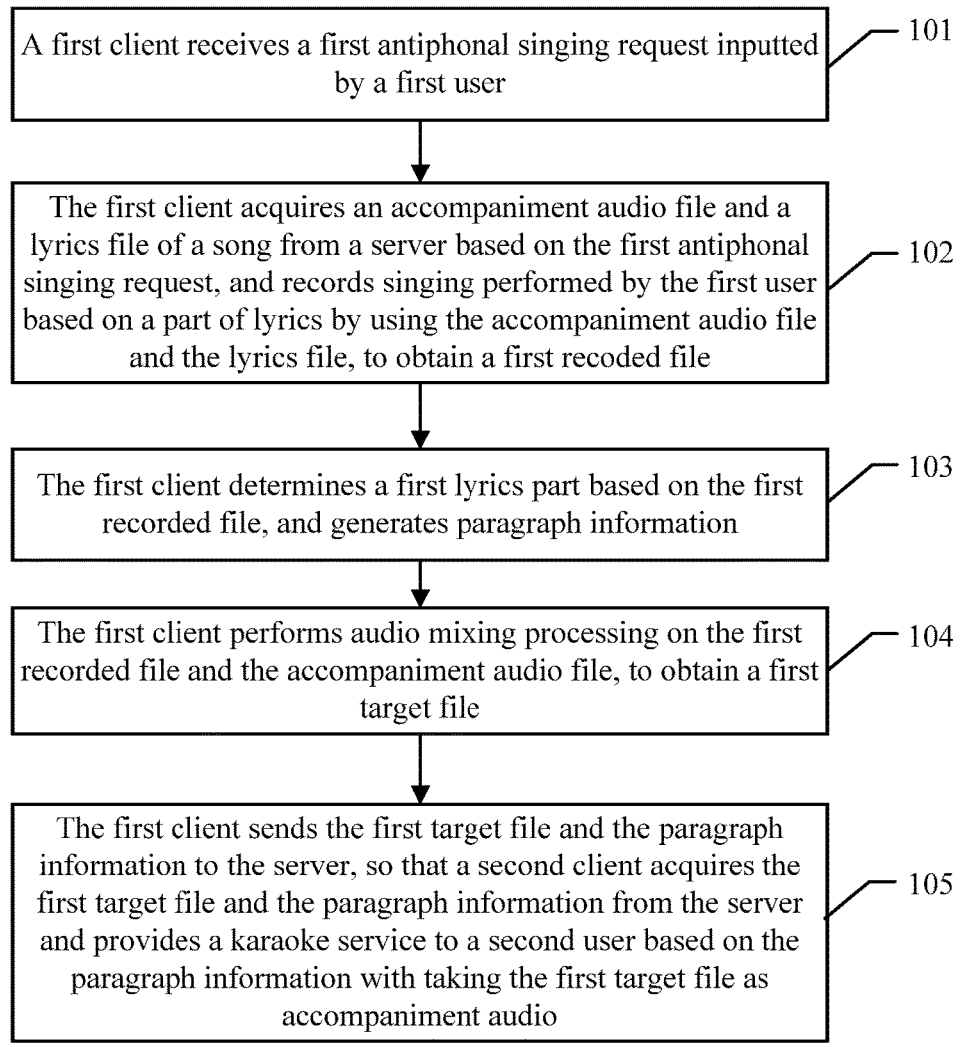
FIG. 1 is a schematic diagram of a karaoke processing method according to an embodiment of the present disclosure.

Referring to FIG. 1, a karaoke processing method according to an embodiment of the present disclosure includes steps 101 to 105.

In step 101, a first client receives a first antiphonal singing request inputted by a first user.

In the embodiment, the first antiphonal singing request is used to request initiating antiphonal singing, to trigger an antiphonal singing initiating flow. For example, in practice, the first client may be provided with a button corresponding to the first antiphonal singing request. The first client receives a first antiphonal singing request when the first user presses the button.

In step 102, the first client acquires an accompaniment audio file and a lyrics file of a song from a server based on the first antiphonal singing request, and records singing performed by the first user to obtain a first recoded file. The singing is performed by the first user based on a part of lyrics by using the accompaniment audio file and the lyrics file.

In the embodiment, upon receiving the first antiphonal singing request, the first client acquires an accompaniment audio file and a lyrics file of a song from a server. The accompaniment audio file and an original audio file are raw audio data. In practice, if the acquired accompaniment audio file and the original audio file are audio data in a compressed format, such as the mp3 format, the first client decompresses the audio data in the compressed format into raw audio data. The lyrics file includes time information for identifying a display time of lyrics, to facilitate synchronizing the lyrics file with the accompaniment audio file based on the time information. For example, the lyrics file may include an LRC lyrics file, which identifies a display time of the lyrics through a time tag included therein.

In the embodiment, after acquiring the accompaniment audio file and the lyrics file, the client plays the accompaniment audio file and the lyrics file, and the first user may select any part of the lyrics to sing. In practice, the first user does not sing all of the lyrics. Synchronously the client records the singing performed by the first user based on the part of the lyrics by using the accompaniment audio file and the lyrics file, to obtain the first recorded file.

In step 103, the first client determines a first lyrics part based on the first recorded file, and generates paragraph information.

In the embodiment, the first lyrics part refers to the part of lyrics already sung by the first user. That is, based on the first recorded file, the first client recognizes the part of lyrics already sung by the first user and generates paragraph information. The paragraph information includes identification information for identifying the first lyrics part, to mark the part of lyrics already sung by the first user.

Optionally, in the embodiment, the identification information may include a display time corresponding to the first lyrics part. For example, a starting time of the first lyrics part is at 10 s, and an ending time of the first lyrics part is at 15 s, and the like. Alternatively, the identification information may include a sentence identifier for the first lyrics part. For example, the first lyrics part includes the first sentence, the third sentence, the fifth sentence and the like. A particular form of the identification information is not limited here, as long as the first client can recognize the first lyrics part based on the identification.

In the embodiment, the first client may determine the first lyrics part in multiple manners. For example, the first client may determine the part of lyrics already sung by the first user through effectiveness of voice in the first recorded file.

For example, the first client determines whether recorded voice of the first user corresponding to a lyrics part is effective, and determines the lyrics part as the first lyrics part in a case that the recorded voice of the first user corresponding to the lyrics part is effective.

Optionally, in the embodiment, the first client determines whether the volume of the recorded voice of the first user corresponding to the lyrics part is greater than a first preset value, and determines that the recorded voice is effective in a case that the volume of the recorded voice is greater than the first preset value. The above processes may be performed by the VAD algorithm or an improved algorithm thereof Preferably, after determining that the recorded voice of the first user corresponding to the lyrics part is effective, the first client further determines whether a time occupied by the recorded voice is consistent with a display time corresponding to the lyrics part, and determines the lyrics part as the first lyrics part in a case that the time occupied by the recorded voice is consistent with the display time corresponding to the lyrics part.

For example, the determination is based on sentences in the lyrics. After it is determined that recorded voice corresponding to a sentence in the lyrics is effective, the sentence of the lyrics is determined as the first lyrics part in a case that a time occupied by the recorded voice corresponding to the sentence of the lyrics is from 20 s to 30 s and a display time corresponding to the sentence of the lyrics is also from 20 s to 30 s. A threshold may be set here. In a case that a coincidence ratio between a time occupied by the recorded voice corresponding to the sentence of the lyrics and a display time corresponding to the sentence of the lyrics is greater than the threshold, it is determined that the time occupied by the recorded voice corresponding to the sentence of the lyrics is consistent with the display time corresponding to the sentence of the lyrics.

It may be understood that the first lyrics part may be determined in other manners in the embodiment, which is not limited here. In practice, the first client may determine the first lyrics part by a real-time audio detecting module using the above determination manners.

In step 104, the first client performs audio mixing processing on the first recorded file and the accompaniment audio file, to obtain a first target file.

In the embodiment, the audio mixing processing may be performed by an existing audio mixing algorithm of, for example, adding data of corresponding sampling points, and then dividing the sum by two.

Optionally, in the embodiment, in order to prevent the first recorded file from further including some noise or voice determined to be ineffective for the other part of the lyrics than the first lyrics part, before step 104 of the karaoke processing method, the first client may clear audio data corresponding to the other part of the lyrics than the first lyrics part in the first recorded file based on the paragraph information. In this way, it can be ensured that the obtained first recorded file includes audio data only in the display time of the first lyrics part, which is equivalent to only including effective voice of the singing of the first user.

In step 105, the first client sends the first target file and the paragraph information to the server, so that a second client acquires the first target file and the paragraph information from the server and provides a karaoke service to a second user based on the paragraph information with taking the first target file as accompaniment audio.

In the embodiment, the second client may provide a karaoke service to a second user based on the paragraph information with taking the first target file as accompaniment audio after acquiring the first target file and the paragraph information from the server. The second user may determine the lyrics part that is already sung based on the paragraph information, and perform singing based on the lyrics that is not sung yet.

Optionally, in the embodiment, the first client may generate a configuration file. The configuration file includes a sound effect parameter used by the first user. The first client sends the configuration file to the server, so that the second client provides a karaoke service to the second user according to the paragraph information and the configuration file with taking the first target file as accompaniment audio. Optionally, the above sound effect parameter includes a reverberation parameter, a sound-modifying and tone-modifying parameter, a voice-beautifying parameter and the like.

In the technical solution according to the embodiment of the present disclosure, upon receiving a first antiphonal singing request inputted by the first user, the first client acquires an accompaniment audio file and a lyrics file of a song from the server based on the first antiphonal singing request, and records singing performed by the first user based on a part of lyrics by using the accompaniment audio file and the lyrics file to obtain a first recorded file. Then the first client determines a first lyrics part and generates paragraph information, where the first lyrics part refers to the part of lyrics already sung by the first user, and the paragraph information includes identification information for identifying the first lyrics part. Then the first client performs audio mixing processing on the first recorded file and the accompaniment audio file to obtain a first target file, and sends the first target file and the paragraph information to the server, so that the second client acquires the first target file and the paragraph information from the server and provides a karaoke service to the second user based on the paragraph information with taking the first target file as accompaniment audio. The first target file in the embodiments of the present disclosure includes the singing of the first user only in the display time of the first lyrics part, and includes an accompaniment for the other part of the lyrics than the first lyrics part. In this case, singing may be performed based on the other part of the lyrics than the first lyrics part according to the paragraph information when the second client takes the first target file as accompaniment audio. Therefore, it can be realized that the first user performs singing in the display time of the first lyrics part, and the second user performs singing in the display time of the other part of the lyrics than the first lyrics part, thereby providing the karaoke experience of singing together with another person.

Figure 2:
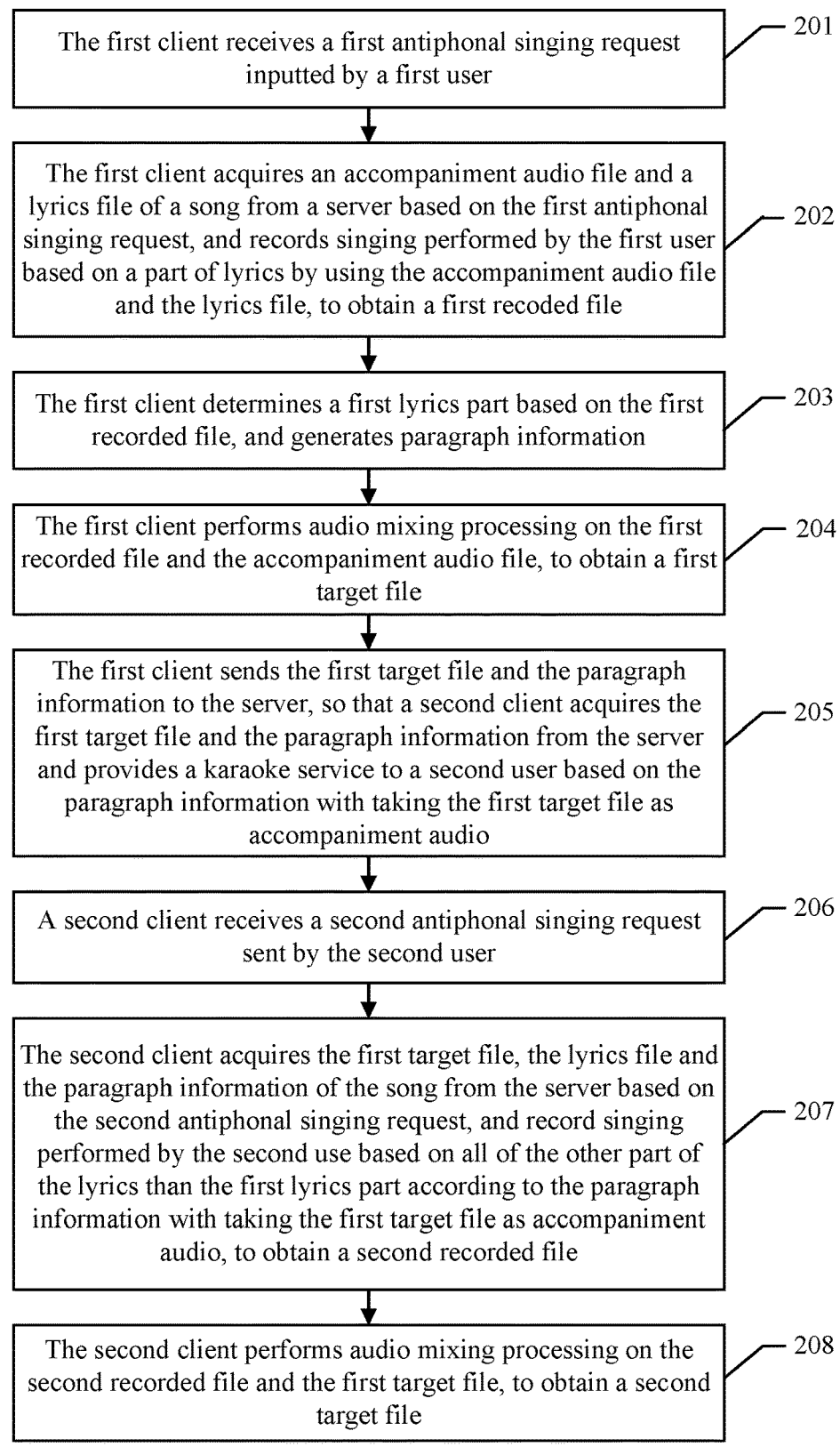
FIG. 2 is a schematic diagram of a karaoke processing method according to another embodiment of the present disclosure.

On the basis of the embodiment shown in FIG. 1, it is further described below how the second client provides a karaoke service to the second user based on the paragraph information with taking the first target file as accompaniment audio to provide the karaoke experience of singing together by two users. Referring to FIG. 2, a karaoke processing method according to another embodiment of the present disclosure includes steps 201 to 207.

In step 201, a first client receives a first antiphonal singing request inputted by a first user.

In step 202, the first client acquires an accompaniment audio file and a lyrics file of a song from a server based on the first antiphonal singing request, and records singing performed by the first user to obtain a first recorded file. The singing is performed by the first user based on a part of lyrics by using the accompaniment audio file and the lyrics file.

In step 203, the first client determines a first lyrics part based on the first recorded file, and generates paragraph information.

In step 204, the first client performs audio mixing processing on the first recorded file and the accompaniment audio file, to obtain a first target file.

In step 205, the first client sends the first target file and the paragraph information to the server, so that a second client acquires the first target file and the paragraph information from the server and provides a karaoke service to a second user based on the paragraph information with taking the first target file as accompaniment audio.

In the embodiment, the processes of step 201 to step 205 are the same as those of step 101 to step 105 in the embodiment shown in FIG. 1, which are not described repeatedly here.

In step 206, the second client receives a second antiphonal singing request sent by the second user.

In the embodiment, the second antiphonal singing request is used to request joining the antiphonal singing, to trigger an antiphonal joining flow. For example, in practice, the second client may be provided with a button corresponding to the second antiphonal singing request, and the second client receives a second antiphonal singing request when the second user presses the button.

In step 207, the second client acquires the first target file, the lyrics file and the paragraph information of the song from the server based on the second antiphonal singing request, and record singing performed by the second user to obtain a second recorded file. The singing is performed by the second user based on all of the other part of the lyrics than the first lyrics part according to the paragraph information with taking the first target file as accompaniment audio.

In the embodiment, the second client acquires the first target file, the lyrics file and the paragraph information from the server upon receiving the second antiphonal singing request, and plays the first target file and the lyrics file. The second user performs singing based on all of the other part of the lyrics than the first lyrics part, and synchronously the second client records the singing performed by the second user based on all of the other part of the lyrics than the first lyrics part according to the paragraph information with taking the first target file as accompaniment audio, to obtain a second recorded file.

Optionally, in the embodiment, in a case that a configuration file is sent to the server by the first client and the server further includes the configuration file, in step 207 the second client may acquire the first target file, the lyrics file, the paragraph information and the configuration file of the song from the server, and record singing performed by the second user based on all of the other part of the lyrics than the first lyrics part according to the paragraph information and the configuration file with taking the first target file as accompaniment audio, to obtain the second recorded file. In practice, the client performs configuration based on the sound effect parameter in the configuration file, and presents the configuration to the second user to be selected by the second user. The second user may also modify the parameter configuration based on actual needs.

In step 208, the second client performs audio mixing processing on the second recorded file and the first target file, to obtain a second target file.

In the embodiment, a process of the audio mixing processing may be performed by an existing audio mixing algorithm of, for example, adding data of corresponding sampling points and dividing the sum by two.

It may be understood that, the second target file in the embodiment includes the singing of the first user corresponding to the first lyrics part, and the singing of the second user corresponding to all of the other part of the lyrics than the first lyrics part, thereby providing a karaoke experience of singing together by two users.

Optionally, in the embodiment, in order to prevent the second recorded file from further including some noise or voice determined to be ineffective in the first lyrics part, before step 208 of the karaoke processing method, the second client may clear audio data corresponding to the first lyrics part in the first recorded file based on the paragraph information.

Figure 3:
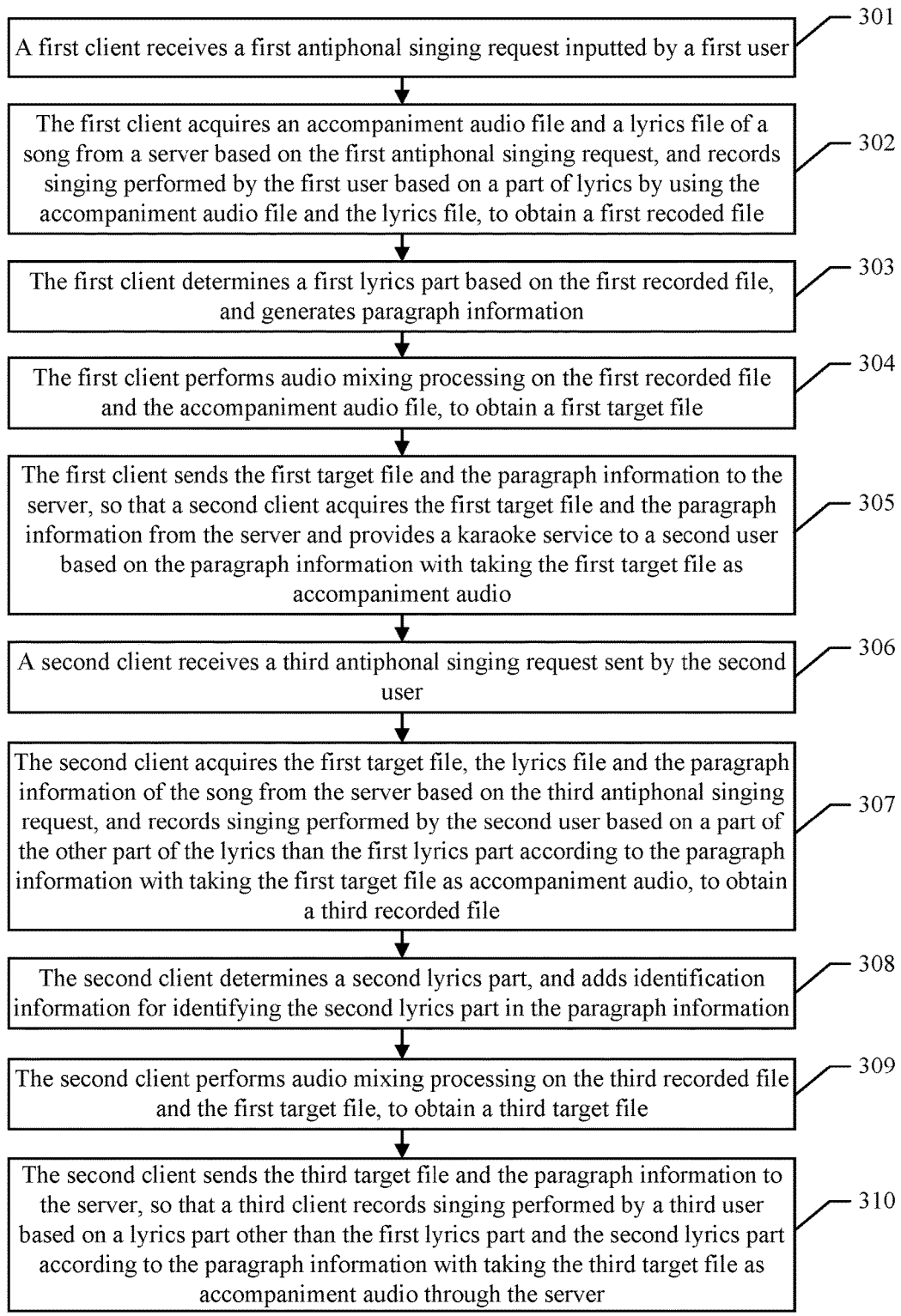
FIG. 3 is a schematic diagram of a karaoke processing method according to another embodiment of the present disclosure.

On the basis of the embodiment shown in FIG. 1, it is further described how the second client provides a karaoke service to the second user based on the paragraph information with taking the first target file as accompaniment audio, to provide the karaoke experience of singing together by multiple users (more than two users). Referring to FIG. 3, a karaoke processing method according to another embodiment of the present disclosure includes steps 301 to 310.

In step 301, a first client receives a first antiphonal singing request inputted by a first user.

In step 302, the first client acquires an accompaniment audio file and a lyrics file of a song from a server based on the first antiphonal singing request, and records singing performed by a first user to obtain a first recorded file. The singing is performed by a first user based on a part of lyrics by using the accompaniment audio file and the lyrics file.

In step 303, the first client determines a first lyrics part based on the first recorded file, and generates paragraph information.

In step 304, the first client performs audio mixing processing on the first recorded file and the accompaniment audio file, to obtain a first target file.

In step 305, the first client sends the first target file and the paragraph information to the server, so that a second client acquires the first target file and the paragraph information from the server and provides a karaoke service to a second user based on the paragraph information with taking the first target file as accompaniment audio.

In the embodiment, the processes of step 301 to step 305 are the same as the processes of step 101 to step 105 in the embodiment shown in FIG. 1, which are not described repeatedly here.

In step 306, the second client receives a third antiphonal singing request sent by the second user.

In the embodiment, the third antiphonal singing request is used to request joining the antiphonal singing and indicate to record based on only a part of the other part of the lyrics than the first lyrics part, to trigger a joining flow in an antiphon initiating mode. For example, in practice, the second client may be provided with a button corresponding to the third antiphonal singing request, and the second client receives a third antiphonal singing request when the second user presses the button.

In step 307, the second client acquires the first target file, the lyrics file and the paragraph information of the song from the server based on the third antiphonal singing request, and records singing performed by the second user to obtain a third recorded file. The singing is performed by the second user based on a part of the other part of the lyrics than the first lyrics part according to the paragraph information with taking the first target file as accompaniment audio.

In the embodiment, upon receiving the third antiphonal singing request, the second clients acquires the first target file, the lyrics file and the paragraph information from the server, and plays the first target file and the lyrics file. The second user performs singing based on a part of the other part of the lyrics than the first lyrics part, and synchronously the second client records singing performed by the second user based on the part of the other part of the lyrics than the first lyrics part according to the paragraph information with taking the first target file as accompaniment audio, to obtain the third recorded file. It should be noted that, the embodiment is different from the embodiment shown in FIG. 2 in that the second user performs singing based on a part of the other part of the lyrics than the first lyrics part, instead of all of the other part of the lyrics than the first lyrics part. Therefore, the song includes a part to be used by another user joining the antiphonal singing.

In step 308, the second client determines a second lyrics part, and adds identification information for identifying the second lyrics part in the paragraph information.

The second lyrics part refers to the part of the lyrics sung by the second user. For the method for determining the second lyrics part and a form of the identification information, one may refer to the description in step 103 in the embodiment shown in FIG. 1, which is not described repeatedly here.

In step 309, the second client performs audio mixing processing on the third recorded file and the first target file, to obtain a third target file.

In the embodiment, a process of the audio mixing processing may be performed by an existing audio mixing algorithm of, for example, adding data of corresponding sampling points and dividing the sum by two.

Optionally, in the embodiment, in order to prevent the third recorded file from further including some noise or voice determined to be ineffective in the other part of the lyrics than the second lyrics part, before step 309 of the karaoke processing method, the second client may further clear audio data corresponding to the other part of the lyrics than the second lyrics part in the third recorded file based on the paragraph information. In this way, it can be ensured that the obtained third recorded file includes audio data only in the display time of the second lyrics part, which is equivalent to only including effective voice of the singing of the second user.

In step 310, the second client sends the third target file and the paragraph information to the server, so that a third client, through the server, records singing performed by a third user based on a lyrics part other than the first lyrics part and the second lyrics part according to the paragraph information with taking the third target file as accompaniment audio.

In the embodiment, the third client acquires the third target file and the paragraph information from the server, and may provide a karaoke service to the third user based on the paragraph information with taking the third target file as accompaniment audio. The third user may determine which part of the lyrics is already sung (including the first lyrics part already sung by the first user and the third lyrics part already sung by the second user), and perform singing based on a lyrics part that is not been sung yet.

Optionally, in the embodiment, the second client may further add a sound effect parameter used by the second user in the configuration file, so that the third client provides a karaoke service to the second user based on the paragraph information and the configuration file with taking the third target file as accompaniment audio. Optionally, the sound effect parameter includes a reverberation parameter, a sound-modifying and tone-modifying parameter, a voice-beautifying parameter and the like.

It may be understood that, the third target file in the embodiment includes the singing performed by the first user based on the first lyrics part and the singing performed by the second user based on the second lyrics part, and one or more other users may perform singing based on a lyrics part other than the first lyrics part and the second lyrics part, thereby providing karaoke experience of singing together by multiple users.

Figure 4:
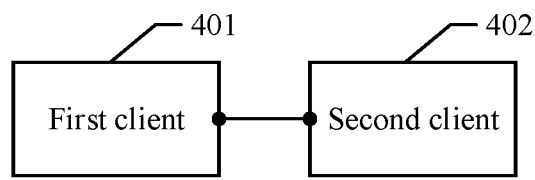
FIG. 4 is a schematic diagram of a karaoke processing system according to an embodiment of the present disclosure.

The karaoke processing method according to the embodiment of the present disclosure is described above, and a karaoke processing system according to an embodiment of the present disclosure is described below. Referring to FIG. 4, the karaoke processing system according to the embodiment of the present disclosure includes a first client and a second client.

The first client 401 is configured to: receive a first antiphonal singing request inputted by a first user, where the first antiphonal singing request is used to request initiating antiphonal singing; acquire an accompaniment audio file and a lyrics file of a song from a server based on the first antiphonal singing request, and record singing performed by the first user to obtain a first recoded file, where the singing is performed by the first user based on a part of lyrics by using the accompaniment audio file and the lyrics file; determine a first lyrics part based on the first recorded file, and generate paragraph information, where the first lyrics part refers to the part of lyrics already sung by the first user, and the paragraph information includes identification information for identifying the first lyrics part; perform audio mixing processing on the first recorded file and the accompaniment audio file to obtain a first target file; and send the first target file and the paragraph information to the server.

The second client 402 is configured to acquire the first target file and the paragraph information from the server, and provide a karaoke service to a second user based on the paragraph information with taking the first target file as accompaniment audio.

Optionally, in the embodiment, the first client 401 may be configured to determine whether recorded voice of the first user corresponding to a lyrics part is effective, and determine the lyrics part as the first lyrics part in a case that the recorded voice of the first user corresponding to the lyrics part is effective.

Optionally, in the embodiment, the first client 401 may be configured to determine whether the volume of the recorded voice of the first user corresponding to the lyrics part is greater than a preset value, and determine that the recorded voice is effective in a case that the volume of the recorded voice is greater than the preset value.

Optionally, in the embodiment, the first client 401 may be configured to determine whether recorded voice of the first user corresponding to a lyrics part is effective, and further determine whether a time occupied by the recorded voice is consistent with a display time corresponding to the lyrics part in a case that the recorded voice of the first user corresponding to the lyrics part is effective, and determine the lyrics part as the first lyrics part in a case that the time occupied by the recorded voice is consistent with the display time corresponding to the lyrics part.

Optionally, in the embodiment, the first client 401 may be further configured to clear audio data corresponding to the other part of the lyrics than the first lyrics part in the first recorded file based on the paragraph information before performing audio mixing processing on the first recorded file and the accompaniment audio file to obtain the first target file.

Optionally, in the embodiment, the identification information includes a display time corresponding to the first lyrics part or a sentence identifier of the first lyrics part.

Optionally, in the embodiment, the first client 401 may be further configured to generate a configuration file before sending the first target file and the paragraph information to the server, and send the configuration file to the server. The configuration file includes a sound effect parameter used by the first user.

Optionally, in the embodiment, the second client 402 may be configured to: receive a second antiphonal singing request sent by a second user, where the second antiphonal singing request is used to request joining the antiphonal singing; acquire the first target file, the lyrics file and the paragraph information of the song from the server based on the second antiphonal singing request, and record singing performed by the second user to obtain a second recorded file, where the singing is performed by the second user based on all of the other part of the lyrics than the first lyrics part according to the paragraph information with taking the first target file as accompaniment audio; and perform audio mixing processing on the second recorded file and the first target file to obtain a second target file.

Optionally, in the embodiment, the second client 402 may be further configured to clear audio data corresponding to the first lyrics part in the second recorded file based on the paragraph information before performing audio mixing processing on the second recorded file and the first target file to obtain the second target file.

Optionally, in the embodiment, the second client 402 may be configured to, in a case that the server further includes the configuration file, acquire the first target file, the lyrics file, the paragraph information and the configuration file of the song from the server, and record singing performed by the second user based on all of the other part of the lyrics than the first lyrics part according to the paragraph information and the configuration file with taking the first target file as accompaniment audio, to obtain the second recorded file.

Optionally, in the embodiment, the second client may be configured to: receive a third antiphonal singing request sent by the second user, where the third antiphonal singing request is used to request joining the antiphonal singing and indicate to record based on only a part of the other part of the lyrics than the first lyrics part; acquire the first target file, the lyrics file and the paragraph information of the song from the server based on the third antiphonal singing request, and record singing performed by the second user to obtain a third recorded file, where the singing is performed by the second user based on the part of the other part of the lyrics than the first lyrics part according to the paragraph information with taking the first target file as accompaniment audio; determine a second lyrics part, and add identification information for identifying the second lyrics part in the paragraph information, where the second lyrics part refers to the lyrics part already sung by the second user; perform audio mixing processing on the third recorded file and the first target file, to obtain a third target file; and send the third target file and the paragraph information to the server, so that a third client, through the server, records singing performed by a third user based on a lyrics part other than the first lyrics part and the second lyrics part according to the paragraph information with taking the third target file as accompaniment audio.

It may be clearly known by those skilled in the art that for convenience and conciseness of description, operating processes of the system, the device and the unit described above are not described repeatedly here, and one may refer to corresponding processes in the method embodiments described above for details.

Figure 5:
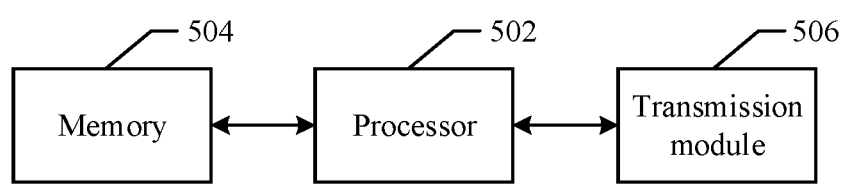
FIG. 5 is a schematic structural diagram of a client to which a karaoke processing method is applied to according to an embodiment of the present disclosure.

Reference is made to FIG. 5, which is a schematic structural diagram of a client to which the karaoke processing method is applied according to an embodiment of the present disclosure. The client in the embodiment is implemented as a computer or a similar operating apparatus. In practice, the client may also be a phone, a panel device or other device.

As shown in FIG. 5, a computing apparatus 500 includes one or more processors 502 (only one processor is shown in FIG. 5), a memory 504 and a transmission module 506. It may be understood by those skilled in the art that the structure shown in FIG. 5 is only for illustration, and is not intended to limit the structure of the above electronic apparatus. For example, the computing apparatus 500 may further include components more or less than components shown in FIG. 5, or have a different configuration from FIG. 5.

The memory 504 may be configured to store a software program and module, for example, program instructions/modules corresponding to the karaoke processing method in the embodiment of the present disclosure. The processor 502 executes various function applications and data processing by running the software program and module stored in the memory 504, to implement the above karaoke processing method. The memory 504 may include a high-speed random memory, and may also include a non-volatile memory, such as one or more magnetic storage, a flash memory or other non-volatile solid-state memory. In some embodiments, the memory 504 may further include a memory arranged remotely with respect to the processor 502, and the remote memory may be connected to the apparatus 500 via a network. The instance of the above network may include but is not limited to the Internet, an intranet, a local network, a mobile communication network and a combination thereof.

The transmission module 506 is configured to receive or transmit data via a network. The above network may include for example a wired network and a wireless network. In an example, the transmission module 506 includes a network interface controller (NIC), which may be connected to another network device or a router via a network cable, to communicate with the Internet. In an example, the transmission module 506 is a radio frequency (RF) module, which is used to communicate with the Internet in a wireless manner.

It should be understood that, according to the embodiments of the present disclosure, the disclosed system, apparatus and methods may be implemented in other ways. For example, the described apparatus embodiment is merely for illustration. The units are divided merely based on logical functions, and the units may be divided with other division manner in practice. For example, multiple units or modules may be combined, or may be integrated into another system, or some features may be omitted or not be implemented. In addition, the displayed or discussed couplings, direct couplings or communication connections may be implemented as indirect couplings or communication connections via some interfaces, devices or units, which may be electrical, mechanical or in other forms.

The units described as separate components may be or not be separated physically. The components shown as units may be or not be physical units, i.e., the units may be located at one place or may be distributed onto multiple network units. All of or part of the units may be selected based on actual needs to implement the solutions according to the embodiments.

In addition, function units according to the embodiments of the present disclosure may be integrated in one processing unit, or the units may exist separately, or two or more units may be integrated in one unit. The integrated unit may be implemented in a form of hardware or a software function unit.

If the integrated units are implemented in the form of software function unit and the software function unit is sold or used as separate products, the software function unit may also be stored in a computer readable storage medium. Based on such understanding, an essential part of the technical solutions of the present disclosure, i.e., the part of the technical solutions of the present disclosure that contribute to the existing technology, or all or a part of the technical solutions may be embodied in the form of a computer software product. The computer software product is stored in a storage medium, and includes several instructions for instructing a computer device (which may be a personal computer, a server, a network device or the like) to implement all or a part of the steps of the methods according to the embodiments of the present disclosure. The foregoing storage medium includes various media that can store program codes, for example, a USB disk, a mobile hard disk drive, a Read-Only Memory (ROM), a Random Access Memory (RAM), a magnetic disk, an optical disk and the like.

To sum up, it should be noted that, the above embodiments are only used to describe the technical solutions of the present disclosure, and not intended to limit the present disclosure. Although the present disclosure is illustrated in detail with reference to the embodiments described above, those skilled in the art should appreciate that modifications may be made to the technical solutions of the embodiments described above, or equivalent substitutions may be made to a part of the technical features in the embodiments. Those modifications and substitutions would not make the essential of the technical solutions deviate from the spirit and the scope of the technical solutions in the embodiments of the present disclosure.

The invention claimed is:

1. A karaoke processing method, comprising:
   receiving, by a first client, a first antiphonal singing request inputted by a first user, wherein the first antiphonal singing request is used to request initiating antiphonal singing;
   acquiring, by the first client, an accompaniment audio file and a lyrics file of a song from a server based on the first antiphonal singing request, and recording, by the first client, singing performed by the first user based on a part of lyrics by using the accompaniment audio file and the lyrics file, to obtain a first recorded file;
   determining, by the first client, a first lyrics part based on the first recorded file and generating paragraph information, wherein the first lyrics part is the part of lyrics already sung by the first user, and the paragraph information comprises identification information for identifying the first lyrics part;
   performing, by the first client, audio mixing processing on the first recorded file and the accompaniment audio file, to obtain a first target file; and
   sending, by the first client, the first target file and the paragraph information to the server.

2. The karaoke processing method according to claim 1, wherein the determining, by the first client, the first lyrics part based on the first recorded file comprises:
   determining, by the first client, whether recorded voice of the first user corresponding to a lyrics part is effective, and
   determining, by the first client, the lyrics part as the first lyrics part in a case that the recorded voice of the first user corresponding to the lyrics part is effective.

3. The karaoke processing method according to claim 2, wherein the determining, by the first client, whether the recorded voice of the first user corresponding to the lyrics part is effective comprises:
   determining, by the first client, whether volume of the voice is greater than a preset value, and
   determining, by the first client, that the recorded voice of the first user corresponding to the lyrics part is effective in a case that the volume of the voice is greater than the preset value.

4. The karaoke processing method according to claim 1, wherein the determining the first lyrics part based on the first recorded file by the first client comprises:
   determining, by the first client, whether recorded voice of the first user corresponding to a lyrics part is effective,
   determining, by the first client, whether a time occupied by the recorded voice is consistent with a display time corresponding to the lyrics part in a case that the recorded voice of the first user corresponding to the lyrics part is effective, and
   determining, by the first client, the lyrics part as the first lyrics part in a case that the time occupied by the recorded voice is consistent with the display time corresponding to the lyrics part.

5. The karaoke processing method according to claim 1, before the performing, by the first client, the audio mixing processing on the first recorded file and the accompaniment audio file to obtain the first target file, further comprising:
   clearing, by the first client, audio data corresponding to the other part of the lyrics than the first lyrics part in the first recorded file based on the paragraph information.

6. The karaoke processing method according to claim 1, wherein
   the identification information comprises a display time corresponding to the first lyrics part or a sentence identifier of the first lyrics part.

7. The karaoke processing method according to claim 1, before the sending, by the first client, the first target file and the paragraph information to the server, further comprising:
   generating a configuration file by the first client, wherein the configuration file comprise a sound effect parameter used by the first user; and
   sending the configuration file to the server by the first client.

8. The karaoke processing method according to claim 1, further comprising:
   acquiring, by a second client, the first target file and the paragraph information from the server, and
   providing, by the second client, a karaoke service to a second user based on the paragraph information with taking the first target file as accompaniment audio.

9. The karaoke processing method according to claim 8, wherein the acquiring, by the second client, the first target file and the paragraph information from the server and providing, by the second client, the karaoke service to the second user based on the paragraph information with taking the first target file as the accompaniment audio comprises:
   receiving, by the second client, a second antiphonal singing request sent by the second user, wherein the second antiphonal singing request is used to request joining the antiphonal singing;
   acquiring, by the second client, the first target file, the lyrics file and the paragraph information of the song from the server based on the second antiphonal singing request, and recording, by the second client, singing performed by the second user based on all of the other part of the lyrics than the first lyrics part according to the paragraph information with taking the first target file as accompaniment audio, to obtain a second recorded file; and
   performing, by the second client, audio mixing processing on the second recorded file and the first target file, to obtain a second target file.

10. The karaoke processing method according to claim 9, before the performing audio mixing processing on the second recorded file and the first target file by the second client to obtain the second target file, further comprising:
    clearing, by the second client, audio data corresponding to the first lyrics part in the second recorded file based on the paragraph information.

11. The karaoke processing method according to claim 9, wherein in a case that the server comprises a configuration file, the acquiring, by the second client, the first target file, the lyrics file and the paragraph information of the song from the server based on the second antiphonal singing request and the recording, by the second client, singing performed by the second user based on a second lyrics part according to the paragraph information with taking the first target file as the accompaniment audio to obtain a second recorded file comprises:
 acquiring, by the second client, the first target file, the lyrics file, the paragraph information and the configuration file of the song from the server, and
 recording, by the second client, singing performed by the second user based on all of lyrics other than the first lyrics part according to the paragraph information and the configuration file with taking the first target file as accompaniment audio, to obtain the second recorded file.

12. The karaoke processing method according to claim 8, wherein the acquiring, by the second client, the first target file and the paragraph information from the server, and providing, by the second client, the karaoke service to the second user based on the paragraph information with taking the first target file as the accompaniment audio comprises:
 receiving, by the second client, a third antiphonal singing request sent by the second user, wherein the third antiphonal singing request is used to request joining the antiphonal singing and indicate to record based on only a part of the other part of the lyrics than the first lyrics part;
 acquiring, by the second client, the first target file, the lyrics file and the paragraph information of the song from the server based on the third antiphonal singing request, and recording, by the second client, singing performed by the second user based on the part of the other part of the lyrics than the first lyrics part according to the paragraph information with taking the first target file as accompaniment audio, to obtain a third recorded file;
 determining, by the second client, a second lyrics part and adding identification information for identifying the second lyrics part in the paragraph information, wherein the second lyrics part is the part of the lyrics already sung by the second user;
 performing, by the second client, audio mixing processing on the third recorded file and the first target file, to obtain a third target file; and
 sending, by the second client, the third target file and the paragraph information to the server, wherein a third client acquires the third target file and the paragraph information from the server and provides a karaoke service to a third user based on the paragraph information with taking the third target file as accompaniment audio.

13. A karaoke processing system, comprising
a first client, and
a second client, wherein
 the first client is configured to: receive a first antiphonal singing request inputted by a first user, wherein the first antiphonal singing request is used to request initiating antiphonal singing; acquire an accompaniment audio file and a lyrics file of a song from a server based on the first antiphonal singing request, and record singing performed by the first user based on a part of lyrics by using the accompaniment audio file and the lyrics file, to obtain a first recorded file; determine a first lyrics part based on the first recorded file and generate paragraph information, wherein the first lyrics part is the part of lyrics already sung by the first user, and the paragraph information comprises identification information for identifying the first lyrics part; perform audio mixing processing on the first recorded file and the accompaniment audio file, to obtain a first target file; and send the first target file and the paragraph information to the server; and
 the second client is configured to acquire the first target file and the paragraph information from the server, and provide a karaoke service to a second user based on the paragraph information with taking the first target file as accompaniment audio.

14. The karaoke processing system according to claim 13, wherein
 the first client is configured to determine whether recorded voice of the first user corresponding to a lyrics part is effective, and determine the lyrics part as the first lyrics part in a case that the recorded voice of the first user corresponding to the lyrics part is effective.

15. The karaoke processing system according to claim 13, wherein the first client is configured to
 determine whether recorded voice of the first user corresponding to a lyrics part is effective,
 determine whether a time occupied by the recorded voice is consistent with a display time corresponding to the lyrics part in a case that the recorded voice of the first user corresponding to the lyrics part is effective, and
 determine the lyrics part as the first lyrics part in a case that the time occupied by the recorded voice is consistent with the display time corresponding to the lyrics part.

16. The karaoke processing system according to claim 13, wherein
 the first client is further configured to clear audio data corresponding to the other part of the lyrics than the first lyrics part in the first recorded file based on the paragraph information before performing the audio mixing processing on the first recorded file and the accompaniment audio file to obtain the first target file.

17. The karaoke processing system according to claim 13, wherein the identification information comprises a display time corresponding to the first lyrics part or a sentence identifier of the first lyrics part.

18. The karaoke processing system according to claim 13, wherein the first client is further configured to:
 generate a configuration file before sending the first target file and the paragraph information to the server, wherein the configuration file comprise a sound effect parameter used by the first user; and
 send the configuration file to the server.

19. The karaoke processing system according to claim 13, wherein the second client is configured to:
 receive a second antiphonal singing request sent by the second user, wherein the second antiphonal singing request is used to request joining the antiphonal singing;
 acquire the first target file, the lyrics file and the paragraph information of the song from the server based on the second antiphonal singing request, and record singing performed by the second user based on all of the other part of the lyrics than the first lyrics part according to the paragraph information with taking the first target file as accompaniment audio, to obtain a second recorded file; and
 perform audio mixing processing on the second recorded file and the first target file, to obtain a second target file.

20. The karaoke processing system according to claim 13, wherein the second client is configured to:

receive a third antiphonal singing request sent by the second user, wherein the third antiphonal singing request is used to request joining the antiphonal singing and indicate to record based on only a part of the other part of the lyrics than the first lyrics part;

acquire the first target file, the lyrics file and the paragraph information of the song from the server based on the third antiphonal singing request, and record singing performed by the second user based on the part of the other part of the lyrics than the first lyrics part according to the paragraph information with taking the first target file as accompaniment audio, to obtain a third recorded file;

determine a second lyrics part and add identification information for identifying the second lyrics part in the paragraph information, wherein the second lyrics part is the part of the lyrics already sung by the second user;

perform audio mixing processing on the third recorded file and the first target file, to obtain a third target file; and send the third target file and the paragraph information to the server, wherein a third client acquires the third target file and the paragraph information from the server and provides a karaoke service to a third user based on the paragraph information with taking the third target file as accompaniment audio.

* * * * *